United States Patent
Gu et al.

(10) Patent No.: US 10,262,135 B1
(45) Date of Patent: Apr. 16, 2019

(54) SYSTEMS AND METHODS FOR DETECTING AND ADDRESSING SUSPICIOUS FILE RESTORE ACTIVITIES

(71) Applicant: Symantec Corporation, Mountain View, CA (US)

(72) Inventors: Lei Gu, Bedford, MA (US); Ilya Sokolov, Boston, MA (US); Haik Mesropian, Glendale, CA (US)

(73) Assignee: Symantec Corporation, Mountain View, CA (US)

( * ) Notice: Subject to any disclaimer, the term of this patent is extended or adjusted under 35 U.S.C. 154(b) by 136 days.

(21) Appl. No.: 15/377,515

(22) Filed: Dec. 13, 2016

(51) Int. Cl.
- *G06F 21/55* (2013.01)
- *G06F 11/14* (2006.01)
- *H04L 29/06* (2006.01)

(52) U.S. Cl.
CPC ........ *G06F 21/554* (2013.01); *G06F 11/1464* (2013.01); *G06F 11/1469* (2013.01); *G06F 21/552* (2013.01); *H04L 63/101* (2013.01); *H04L 63/1441* (2013.01); *G06F 2201/86* (2013.01)

(58) Field of Classification Search
CPC ............ G06F 21/565; G06F 2221/034; G06F 21/554; G06F 11/1464; G06F 11/1469; G06F 21/552; G06F 2201/86; H04L 63/101; H04L 63/1441
See application file for complete search history.

(56) References Cited

U.S. PATENT DOCUMENTS

| | | | |
|---|---|---|---|
| 8,533,818 B1 * | 9/2013 | Ketterhagen | G06F 21/567 726/22 |
| 9,762,386 B1 * | 9/2017 | Nassaje | H04L 9/0819 |
| 9,852,289 B1 * | 12/2017 | Mann | G06F 21/60 |
| 9,935,973 B2 * | 4/2018 | Crofton | H04L 63/145 |
| 2005/0138402 A1 * | 6/2005 | Yoon | G06F 21/55 713/193 |
| 2008/0195676 A1 * | 8/2008 | Lyon | G06F 11/1469 |
| 2011/0082838 A1 * | 4/2011 | Niemela | G06F 11/1458 707/654 |
| 2013/0167235 A1 * | 6/2013 | Kapoor | G06F 21/56 726/24 |
| 2015/0324301 A1 * | 11/2015 | Iizuka | G06F 21/00 713/193 |
| 2017/0140156 A1 * | 5/2017 | Gu | G06F 21/602 |
| 2017/0177867 A1 * | 6/2017 | Crofton | G06F 21/565 |
| 2017/0180394 A1 * | 6/2017 | Crofton | H04L 63/145 |
| 2017/0206353 A1 * | 7/2017 | Jai | G06F 21/565 |
| 2017/0223031 A1 * | 8/2017 | Gu | G06F 3/0623 |
| 2017/0270293 A1 * | 9/2017 | Gu | G06F 21/54 |

(Continued)

*Primary Examiner* — Joseph P Hirl
*Assistant Examiner* — Stephen T Gundry
(74) *Attorney, Agent, or Firm* — FisherBroyles, LLP (57) ABSTRACT

The disclosed computer-implemented method for detecting and addressing suspicious file restore activities may include (i) detecting a restore activity during which files are restored to a client device from a previously stored backup of the files, (ii) determining that a total number of the files restored during the restore activity exceeds a threshold number, and (iii) performing, based on the total number of the files exceeding the threshold number, a security action to protect the client device from a malicious threat associated with the restore activity. Various other methods, systems, and computer-readable media are also disclosed.

20 Claims, 6 Drawing Sheets

(56) References Cited

U.S. PATENT DOCUMENTS

| | | | | |
|---|---|---|---|---|
| 2017/0302458 A1* | 10/2017 | Berger | .................. | H04L 9/3268 |
| 2017/0302635 A1* | 10/2017 | Humphries | ......... | H04L 63/0471 |
| 2017/0302653 A1* | 10/2017 | Ortner | ................ | G06F 21/6218 |
| 2017/0302696 A1* | 10/2017 | Schutz | ................ | H04L 63/1441 |
| 2017/0324755 A1* | 11/2017 | Dekel | .................. | H04L 63/145 |
| 2017/0351854 A1* | 12/2017 | Knapp | .................. | G06F 21/445 |
| 2017/0351858 A1* | 12/2017 | Knapp | ................ | G06F 21/6218 |
| 2017/0351870 A1* | 12/2017 | Knapp | .................... | G06F 21/34 |
| 2017/0351877 A1* | 12/2017 | Knapp | .............. | G06F 17/30165 |
| 2017/0353460 A1* | 12/2017 | Knapp | .................... | G06F 21/56 |
| 2017/0353461 A1* | 12/2017 | Knapp | .................. | H04L 9/3247 |
| 2017/0353484 A1* | 12/2017 | Knapp | .................. | H04L 63/123 |
| 2017/0359370 A1* | 12/2017 | Humphries | ......... | H04L 63/1441 |
| 2017/0364681 A1* | 12/2017 | Roguine | ............... | G06F 21/554 |
| 2018/0007069 A1* | 1/2018 | Hunt | .................... | H04L 63/1416 |
| 2018/0020013 A1* | 1/2018 | Yoshikawa | ............ | G06F 21/554 |
| 2018/0024893 A1* | 1/2018 | Sella | .................... | G06F 11/1458 |
| 2018/0032446 A1* | 2/2018 | Amarendran | ........... | H04L 67/10 |
| 2018/0048657 A1* | 2/2018 | Hittel | ................ | G06F 17/30997 |
| 2018/0048658 A1* | 2/2018 | Hittel | ................ | G06F 17/30997 |
| 2018/0075234 A1* | 3/2018 | Boutnaru | .............. | G06F 21/554 |
| 2018/0075239 A1* | 3/2018 | Boutnaru | .............. | G06F 21/554 |
| 2018/0102902 A1* | 4/2018 | Yang | ...................... | G06F 21/602 |
| 2018/0107824 A1* | 4/2018 | Gibbons, Jr. | ......... | G06F 21/565 |
| 2018/0107834 A1* | 4/2018 | Erofeev | .............. | G06F 21/6218 |
| 2018/0107838 A1* | 4/2018 | Amarendran | ....... | G06F 21/6245 |
| 2018/0121650 A1* | 5/2018 | Brown | .................. | G06F 21/565 |
| 2018/0139053 A1* | 5/2018 | Kadam | ................ | H04L 9/3247 |
| 2018/0157833 A1* | 6/2018 | Chelarescu | ........... | G06F 21/554 |

* cited by examiner

SYSTEMS AND METHODS FOR DETECTING AND ADDRESSING SUSPICIOUS FILE RESTORE ACTIVITIES

BACKGROUND

The use of computing devices has increased significantly as such devices become more ubiquitous. Computing devices have become an integral part of data creation, data usage, and data storage in a number of different environments. The widespread use of various computing devices has been accelerated by the increased use of computer networks, including the Internet and cloud-based networks.

However, the increasing use of computing devices has also led to the continued spread of malware and computer viruses, costing individuals and organizations significant amounts of time and money and placing sensitive data at risk. Malware creators are continually devising new ways to infect computing systems and devices. Computing devices are frequently attacked by emerging malware threats that cannot be adequately identified and countered by common signature-based detection systems. The instant disclosure, therefore, identifies and addresses a need for systems and methods for detecting and addressing suspicious file restore activities.

SUMMARY

As will be described in greater detail below, the instant disclosure describes various systems and methods for detecting and addressing suspicious file restore activities. In one example, a computer-implemented method for detecting and addressing suspicious file restore activities may include (i) detecting a restore activity during which files are restored to a client device from a previously stored backup of the files, (ii) determining that a total number of the files restored during the restore activity exceeds a threshold number, and (iii) performing, based on the total number of the files exceeding the threshold number, a security action to protect the client device from a malicious threat associated with the restore activity. In some embodiments, the threshold number may correspond to a specified percentage of all files stored on the client device.

In some embodiments, the computer-implemented method may include identifying a computer process that modified, prior to the restore activity, at least one of the files that were restored during the restore activity. In one example, performing the security action may include blocking the computer process. The computer-implemented method may further include identifying a source of the computer process. Additionally, the computer-implemented method may include correlating the computer process with at least one other computer process related to at least one other restore activity on at least one other client device.

In at least one embodiment, the computer-implemented method may further include identifying at least one of the files that were restored during the restore activity. The computer-implemented method may further include determining whether the at least one of the files was modified prior to being restored. In one example, the computer-implemented method may further include identifying at least one source of the files that were restored during the restore activity. Performing the security action may include preventing the client device from accessing the at least one source of the files.

In one embodiment, the computer-implemented method may further include correlating the files restored to the client device with other files restored to at least one other client device during at least one other restore activity. The computer-implemented method may further include identifying at least one of a suspicious process and a suspicious file related to the restore activity.

In some embodiments, the computer-implemented method may further include (i) detecting an additional restore activity to restore a group of files to the client device from the previously stored backup of the files, (ii) determining that a total number of files in the group of files is at or below the threshold number, and (iii) not performing, based on the total number of the files in the group of files being at or below the threshold number, an additional security action. In at least one embodiment, performing the security action may include preventing the client device from accessing at least one of a file, a computer process, and a file source. In some embodiments, performing the security action may include adding at least one of a file, a computer process, and a file source to a blacklist. In at least one embodiment, the computer-implemented method may further include determining whether the files were restored to the client device from another computing device during the restore activity.

In one embodiment, a system for detecting and addressing suspicious file restore activities may include several modules stored in memory, including (i) a detecting module, stored in memory, that detects a restore activity during which files are restored to a client device from a previously stored backup of the files, (ii) a determining module, stored in memory, that determines that a total number of the files restored during the restore activity exceeds a threshold number, (iii) a security module, stored in memory, that performs, based on the total number of the files exceeding the threshold number, a security action to protect the client device from a malicious threat associated with the restore activity, and (iv) at least one processor that executes the detecting module, the determining module, and the security module. The system may include an identifying module, stored in memory, that identifies a computer process that modified, prior to the restore activity, at least one of the files that were restored during the restore activity. In some examples, the system may include an identifying module, stored in memory, that identifies at least one of the files that were restored during the restore activity. In at least one example, the system may include an identifying module, stored in memory, that identifies at least one source of the files that were restored during the restore activity.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect a restore activity during which files are restored to a client device from a previously stored backup of the files, (ii) determine that a total number of the files restored during the restore activity exceeds a threshold number, and (iii) perform, based on the total number of the files exceeding the threshold number, a security action to protect the client device from a malicious threat associated with the restore activity.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting and addressing suspicious file restore activities. As will be explained in greater detail below, the systems and methods described herein may enable early detection and prevention of malware attacks by detecting and analyzing file restore activities on client computing devices. The systems and methods described herein may do so by identifying potentially malicious files, computer processes, and/or file sources that are associated with file restore activities. Additionally, the systems and methods described herein may correlate and analyze data from malware attacks related to suspicious file restore activities on multiple client computing devices.

The systems and methods described herein may improve the functioning of a computing device by enabling early detection of malware, thereby improving the security of the computing device and reducing time and resources expended to repair the computing device in the event that it is compromised by malware. These systems and methods may also improve the field of computer security by correlating and analyzing data from file restore activities occurring on multiple computing devices and utilizing the data to identify and prevent malware attacks on these and other computing devices.

Figure 1:
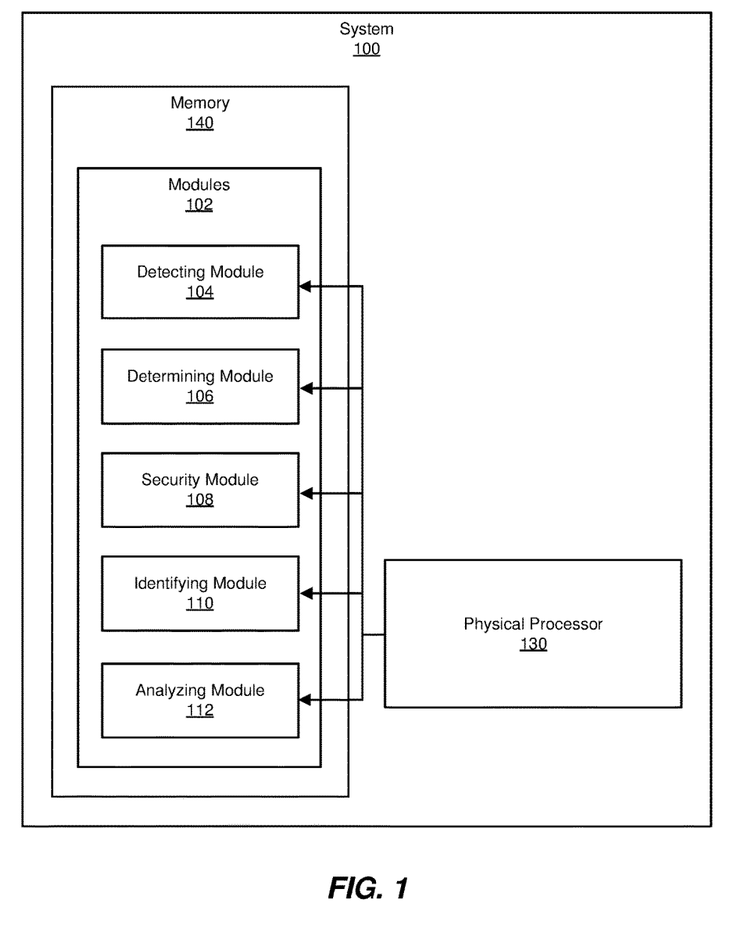
FIG. 1 is a block diagram of an example system for detecting and addressing suspicious file restore activities.
Figure 2:
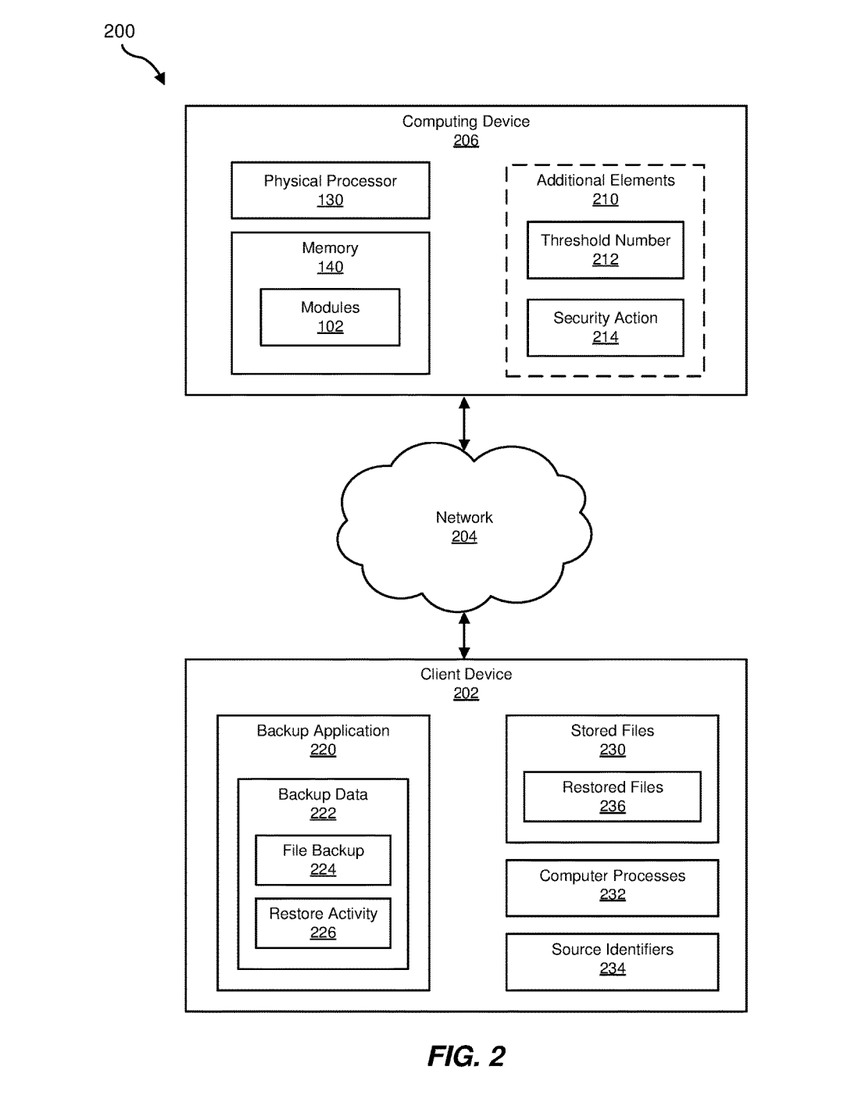
FIG. 2 is a block diagram of an additional example system for detecting and addressing suspicious file restore activities.
Figure 3:
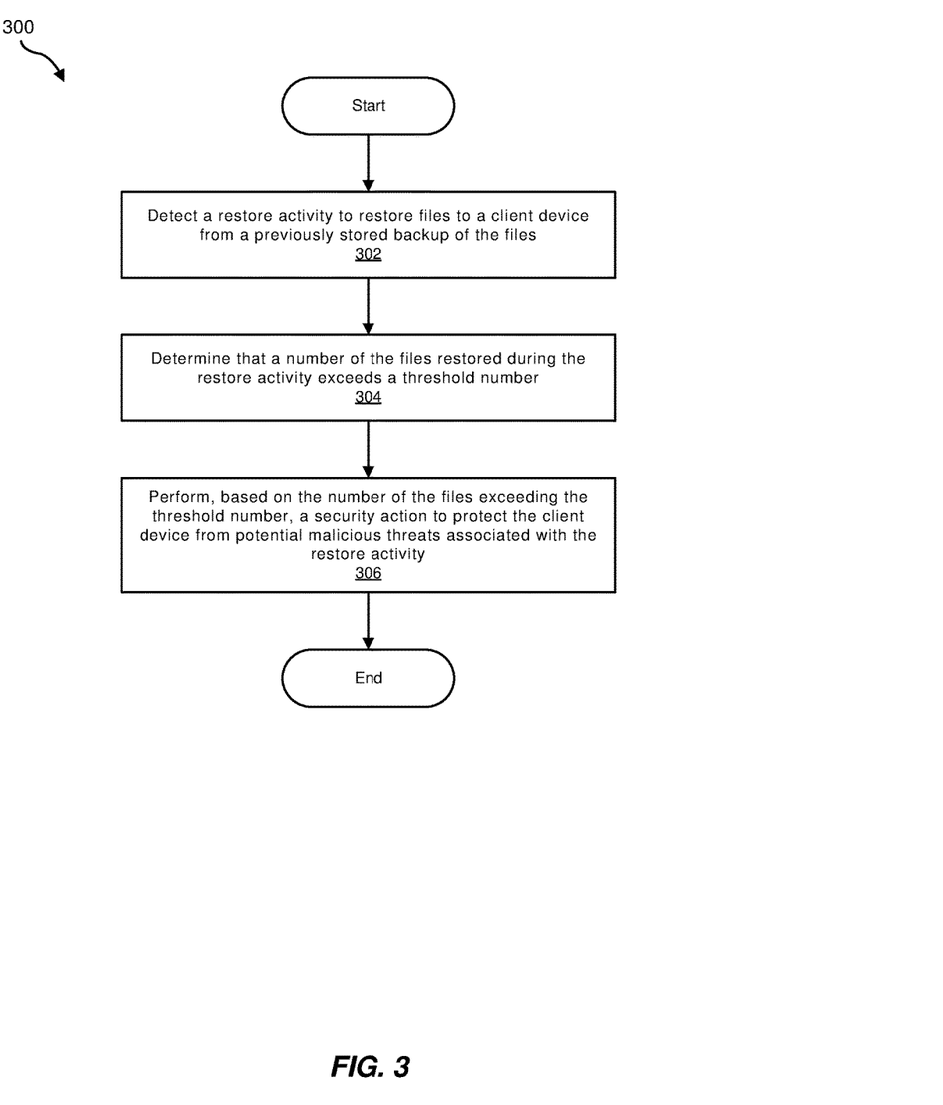
FIG. 3 is a flow diagram of an example method for detecting and addressing suspicious file restore activities.
Figure 4:
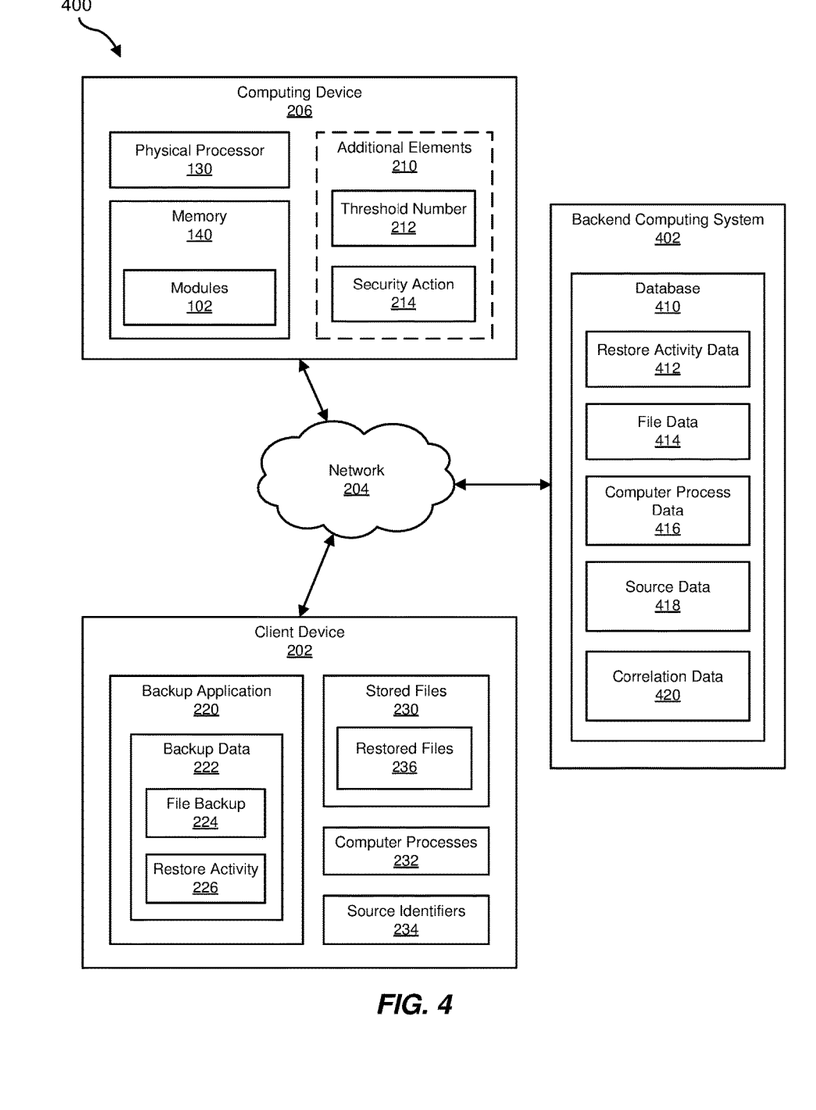
FIG. 4 is a block diagram of an additional example system for detecting and addressing suspicious file restore activities.

The following will provide, with reference to FIGS. 1-2 and 4, detailed descriptions of example systems for detecting and addressing suspicious file restore activities. Detailed descriptions of corresponding computer-implemented methods will also be provided in connection with FIG. 3. In addition, detailed descriptions of an example computing system and network architecture capable of implementing one or more of the embodiments described herein will be provided in connection with FIGS. 5 and 6, respectively.

FIG. 1 is a block diagram of an example system 100 for detecting and addressing suspicious file restore activities. As illustrated in this figure, example system 100 may include one or more modules 102 for performing one or more tasks. For example, as will be explained in greater detail below, exemplary system 100 may include a detecting module 104 that detects a restore activity during which files are restored to a client device from a previously stored backup of the files.

Exemplary system 100 may additionally include a determining module 106 that determines whether a total number of the files restored during the restore activity exceeds a threshold number. Exemplary system 100 may also include a security module 108 that performs, based on the total number of the files exceeding the threshold number, a security action to protect the client device from a malicious threat associated with the restore activity. Additionally, exemplary system 100 may include an identifying module 110 that identifies files, computer processes, and/or file sources that are related to the restore activity. Exemplary system 100 may further include an analyzing module 112 that analyzes and/or correlates data related to one or more restore activities. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIGS. 2 and 4 (e.g., client device 202, computing device 206, and/or backend computing system 402), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting and addressing suspicious file restore activities. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a client device 202 in communication with a computing device 206 via a network 204. In one example, all or a portion of the functionality of modules 102 may be performed by client device 202, computing device 206, and/or any other suitable computing system. As will be described in greater detail below, one or more of modules 102 from FIG. 1 may, when executed by at least one processor of client device 202 and/or computing device 206, enable client device 202 and/or computing device 206 to detect and address suspicious file restore activities.

For example, and as will be described in greater detail below, one or more of modules 102 from FIG. 1 may cause client device 202 and/or computing device 206 to detect a restore activity 226 during which files are restored to client device 202 from a previously stored file backup 224 of the files. In one embodiment, client device 202 may include a backup application 220 (i.e., a backup client) that includes backup data 222, including file backup 224, which was generated from stored files 230 stored on client device 202. In some embodiments, backup application 220 and/or backup data 222 may be located on another computing device or system, such as, for example, computing device 206. Backup application 220 may carry out restore activity 226 to restore restored files 236 to client device 202 from file backup 224, which was generated and stored previously by backup application 220.

In at least one embodiment, as illustrated in FIG. 2, exemplary system 200 may include one or more additional elements 210, including, for example, a threshold number 212 and a security action 214. One or more of modules 102 may cause client device 202 and/or computing device 206 to determine that a total number of restored files 236 restored from file backup 224 by backup application 220 during restore activity 226 exceeds threshold number 212. Additionally, one or more of modules 102 may cause client device 202 and/or computing device 206 to perform, based on the total number of restored files 236 exceeding threshold number 212, security action 214 to protect client device 202 and/or other computing devices and systems from a malicious threat associated with restore activity 226.

Client device 202 generally represents any type or form of computing device capable of reading computer-executable instructions. For example, client device 202 may be a desktop computer or laptop computer used by an individual or an organization. Additional examples of client device 202 include, without limitation, tablets, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Computing device 206 generally represents any type or form of computing device or system that is capable of providing a security service to protect client device 202 and other computing devices connected to network 204 from malicious attacks and preserve data integrity. Examples of computing device 206 include, without limitation, security servers, application servers, web servers, storage servers, and/or database servers configured to run certain software applications and/or provide various security, web, storage, and/or database services. Although illustrated as a single entity in FIG. 2, computing device 206 may include and/or represent a plurality of servers that work and/or operate in conjunction with one another. Additional examples of computing device 206 include, without limitation, laptops, tablets, desktops, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. In one example, network 204 may facilitate communication between client device 202 and computing device 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

FIG. 3 is a flow diagram of an example computer-implemented method 300 for detecting and addressing suspicious file restore activities. The steps shown in FIG. 3 may be performed by any suitable computer-executable code and/or computing system, including system 100 in FIG. 1, system 200 in FIG. 2, system 400 in FIG. 4, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may detect a restore activity during which files are restored to a client device from a previously stored backup of the files. For example, detecting module 104 may, as part of computing device 206 and/or client device 202 in FIG. 2, detect restore activity 226 during which restored files 236 are restored to client device 202 from a previously stored file backup 224.

Detecting module 104 may detect restore activity 226 in a variety of contexts. For example, detecting module 104 may detect that restore activity 226 has been initiated on client device 202 by a user or administrator via backup application 220. In some examples, detecting module 104 may detect that restore activity 226 has been initiated automatically in response to an initiating event. For example, restore activity 226 may be initiated automatically in response to backup application 220 or another application, such as a security application, detecting that one or more files have been potentially compromised (e.g., by malware) and/or partially or fully removed from computing device 202.

In at least one embodiment, restore activity 226 may restore restored files 236 from a file backup 224 in backup data 222. File backup 224 may be stored on client device 202, computing device 206, and/or another backup location and may include any suitable backup of some or all of stored files 230 located on client device 202. For example, file backup 224 may include compressed files (e.g., ZIP files, etc.) corresponding to some or all of stored files 230. In one example, file backup 224 may include a block-based backup of some or all of stored files 230 saved as at least one disk image, or system image, of client device 202, including, for example, the operating system and data volumes present on client device 202. In some examples, file backup 224 may include non-compressed versions of some or all of stored files 230.

File backup 224 may be generated using any suitable backup methodology, without limitation. In one example, file backup 224 may be generated during one or more backup time frames. In at least one embodiment, file backup 224 may be generated in a full system backup during which all or substantially all data on client device 202, or in a partitioned section of client device 202, is backed up during a backup activity. In some embodiments, file backup 224 may be generated incrementally such that data is added to file backup 224 periodically as data on client device changes (e.g., data that has been modified, added, deleted, etc.). For example, stored files 230 that are added since a previous backup activity may be backed up and stored in file backup 224 during a subsequent backup activity. In one embodiment, incremental backups may backup less than every data unit (e.g., segment, block, sector, cluster, file, etc.) in a set of data units. File backup 224 may additionally or alternatively be generated according to any other suitable backup procedure, including, for example, at least one differential backup activity and/or synthetic backup activity.

Backup application 220 may restore restored files 236 to client device 202 during restore activity 226 in any suitable manner. For example, backup application 220 may restore some or all of stored files 230 as restored files 236 to client device 202. In at least one embodiment, backup application 220 may restore restored files 236 to client device 202 by copying restored files 236 from file backup 224. In some embodiments, backup application 220 may restore restored files 236 to client device 202 by reproducing restored files 236 from compressed file versions stored in file backup 224. For example, backup application 220 may extract (e.g., unzip) archived files (e.g., ZIP files) stored in file backup 224. In one embodiment, backup application 220 may restore restored files 236 to client device 202 by reproducing restored files 236 from an image (e.g., system image or disk image) stored in file backup 224. In some examples, only some files of stored files 230 may be restored to client device 202. A user, administrator, or security application may, for example, designate only certain files of stored files 230 to be restored during restore activity 226. In additional examples, all or substantially all of stored files 230 may be restored to computing device 202 during restore activity 226.

At step 304, one or more of the systems described herein may determine that a total number of the files restored during the restore activity exceeds a threshold number. For example, determining module 106 may, as part of client device 202 and/or computing device 206 in FIG. 2, determine that a total number of restored files 236 restored during restore activity 226 exceeds threshold number 212. Determining module 106 may determine that the total number of restored files 236 exceeds threshold number 212 in a variety of contexts. For example, determining module 106 may determine the total number of files that were restored or that are designated to be restored as restored files 236 during restore activity 226. Determining module 106 may then determine whether the total number of restored files 236 exceeds threshold number 212.

Threshold number 212 may be determined in any suitable manner. For example, threshold number 212 may correspond to a specified number of files. Threshold number 212 may, for example, be a predefined number representing a restored file limit at or below which a restore activity is determined to be non-significant. In some embodiments, threshold number 212 may correspond to a proportion of files restored to client device 202 out of a set of stored files on client device 202. For example, predetermined threshold number 212 may be determined by identifying a total number of stored files 230 located on client device 202, or on a portion of client device 202 (e.g., a partition or disk drive), and determining a number of files corresponding to a specified percentage of the total number of stored files 230. The specified percentage may, for example, represent a restored file limit at or below which a restore activity is determined to be non-significant.

Determining module 106 may, as part of client device 202 and/or computing device 206, determine whether a total number of restored files 236 restored during restore activity 226 exceeds threshold number 212. If the total number of restored files 236 is at or below threshold number 212, determining module 106 may determine that restore activity 226 is not significant. For example, a restore activity that restores a number of files that is at or below threshold number 212 may be the result of a non-malicious activity initiated by a user or administrator of client device 202. A user of client device 202 may, for example, accidentally delete or change a limited number of stored files 230 on client device 202. The user may in turn initiate restore activity 226 to restore the accidentally deleted and/or changed files to client device 202. In some embodiments, if determining module 106 determines that restore activity 226 is not significant, determining module 106 may further determine that restore activity 226 is likely not related to a potentially malicious threat. In one example, the methods and systems described herein may not take any further action with respect to a restore activity 226 that is determined to be non-significant.

In at least one embodiment, if the total number of restored files 236 restored during restore activity 226 is determined to exceed threshold number 212, then determining module 106 may determine that restore activity 226 is a significant restore activity that may be related to a potentially malicious threat. For example, as will be discussed in greater detail below, restore activity 226 may have been triggered in response to a malware threat that modified one or more files and/or related data or processes on client device 202.

In some embodiments, if the total number of restored files 236 restored during restore activity 226 is determined to exceed threshold number 212, determining module 106 may further determine whether restored files 236 were restored to client device 202 based on files stored, or previously stored, on client device 202, or whether restored files 236 were restored to client device 202 from another computing device or based on files stored on another computing device. For example, determining module 106 may determine whether restored files 236 originated from client device 202 or from another computing device. If restored files 236 are determined to have originated from a computing device other than client device 202, determining module 106 may determine that restore activity 226 is not significant.

For example, a restore activity that restores files originating from another computing device may be triggered by a user or administrator that is transferring files from one computing device to another computing device. Client device 202 may, for example, be a more recently acquired computing device, and a user of client device 202 may utilize restore activity 226 to transfer files from another computing device to the more recently acquired client device 202. In such instances, determining module 106 may therefore determine that restore activity 226 is not significant and is likely not related to a potentially malicious threat. Moreover, a restore activity that restores files originating from one disk drive and/or storage location to another disk drive and/or storage location may be determined to be a non-significant restore activity, even when the separate disk drives and/or storage locations are all located on client device 202.

In one example, the methods and systems described herein may not take any further action with respect to a restore activity 226 that is determined to be non-significant. In at least one embodiment, if the total number of restored files 236 restored during restore activity 226 is determined to exceed threshold number 212, and additionally, if the restored files 236 are determined to have originated from files currently stored and/or previously stored on client device 202, then determining module 106 may determine that restore activity 226 may be related to a potentially malicious threat.

In some embodiments, one or more of the systems described herein may identify a computer process that modified, prior to the restore activity, at least one of the files that were restored during the restore activity. For example, identifying module 110 may, as part of client device 202 and/or computing device 206, identify at least one computer process of computer processes 232 that modified at least one of the stored files 230 that was restored as one of restored files 236 during restore activity 226. Identifying one or more computer processes that modified one or more of the stored files 230 prior to restore activity 226 may be useful in identifying computer processes that are potentially malicious. For example, one or more computer processes that modified stored files 230 in such a manner that restore activity 226 was initiated to restore the modified stored files 230 may be identified out as suspicious processes. In some embodiments, as will be described in greater detail below, a security action may be performed to prevent such suspicious processes from harming client device 202 and/or other computing device and systems. In at least one embodiment, as will be explained in great detail below, suspicious processes of computer processes 232 on client device 202 may be further analyzed and/or data related to the suspicious processes may be stored and compared to suspicious processes associated with one or more other restore activities on client device 202 and/or other computing devices.

In additional embodiments, suspicious files of stored files 230 on client device, such as one or more restored files 236 that were restored during restore activity 226 and/or one or more files related to a suspicious process, may be further analyzed and/or data related to the suspicious files may be stored and compared to other suspicious files on client device 202 and/or other computing devices. In some examples, analyzing module 112 may, as part of client device 202 and/or computing device 206, further analyze at least one suspicious process and/or suspicious file associated with restore activity 226. For example, analyzing module 112 may determine whether additional files of restored files 236 were also modified by the at least one suspicious process. Analyzing module 112 may further determine, for example, whether the at least one suspicious process and/or suspicious file was associated with other restore activities on client device 202 and/or one or more other computing devices.

In some embodiments, analyzing module 112 may further determine a source and/or reputation of at least one suspicious process of computer processes 232 and/or at least one suspicious file of stored files 230. For example, analyzing module 112 may determine a source identifier of source identifiers 234 identifying at least one suspicious source location of the at least one suspicious process and/or the at least one suspicious file. Source identifiers 234 may include source data associated with stored files 230 and/or computer processes 232. Examples of source identifiers 234 may include identifying source data associated with stored files 230 and/or computer processes 232, including, without limitation, Internet addresses, such as Uniform Resource Locator (URL) and Internet Protocol (IP) addresses, disk drive identifiers, file path locations, email addresses, Media Access Control (MAC) addresses, Network Access Identifiers (NAI), and/or any other suitable source identifier for a file or process.

In one embodiment, analyzing module 112 may determine whether one or more source identifiers associated with at least one suspicious process and/or suspicious file are associated with known or unknown sources or origins. For example, analyzing module 112 may determine whether a source identifier associated with a suspicious process and/or file indicates a known source and/or origin. In some examples, analyzing module 112 may determine a reputation for a suspicious process, a suspicious file, and/or a source identifier associated with a suspicious process and/or file. For example, analyzing module 112 may retrieve reputation data associated with a process, files, and/or source identifier from a reputation database.

In some embodiments, analyzing module 112 may determine how a suspicious file, such as a file associated with a suspicious process, was transferred to client device 202. For example, a user's activities may be traced to determine what actions taken by a user of client device 202 may have resulted in a suspicious file being stored on client device 202. Analyzing module 112 may, for example, identify an Internet location (e.g., a URL) that the user visited at or near the time that a suspicious file was downloaded to client device 202. Analyzing module 112 may also, for example, identify an email attachment that the user opened, resulting in a suspicious file being stored on client device 202. In some embodiments, analyzing module 112 may determine, for example, that a suspicious file was transferred to client device 202 via a memory device (e.g., a memory card, a USB drive, etc.) connected to client device 202.

At step 306, one or more of the systems described herein may perform, based on the total number of the files exceeding the threshold number, a security action to protect the client device from a malicious threat associated with the restore activity. For example, security module 108 may perform, as part of client device 202 and/or computing device 206, security action 214 to protect client device 202 from a malicious threat associated with restore activity 226.

Security module 108 may perform security action 214 in a variety of contexts. For example, if a source of a suspicious process and/or file is not known, or if a reputation for the source identifier indicates that the source may be untrustworthy, security module 108 may perform a security action to protect client device 202 and/or other computing devices from the suspicious process and/or file. In at least one embodiment, security action 214 may include preventing a suspicious process of computer processes 232 and/or a suspicious file of stored files 230 from performing any actions on client device 202 and/or another computing device or system.

Security module 108 may also perform security action 214 by, for example, alerting a user and/or an administrator to the potential maliciousness of a suspicious process and/or file, blocking downloads of a suspicious process and/or file, and/or quarantining and/or deleting a suspicious process and/or file. In at least one example, security module 108 may perform a security action by blacklisting a suspicious source (e.g., URL, IP address, email address, etc.) of a suspicious process and/or file. In some examples, security action 214 may include transmitting data related to a suspicious process and/or file to a backend computing system, such as a security service backend, to add the suspicious process and/or file, and/or related source data (e.g., URL, IP address, etc.), to a reputation database to prevent malicious attacks on other computing devices and systems.

In some embodiments, analysis module 112 may transmit data related to restore activity 226 on client device 202 to a backend computing system, such as a security service backend, for further analysis, comparison, and correlation with restore activities on other computing devices. For example, as illustrated in FIG. 4, an example system 400 may include client device 202 in communication with computing device 206 and a backend computing system 402 via network 204.

Backend computing system 402 generally represents any type or form of computing system capable of reading computer-executable instructions. Examples of backend computing system 402 include, without limitation, servers and/or computing devices that provide security services for client computing devices and systems. Additional examples of backend computing system 402 include, without limitation, security servers, application servers, web servers, storage servers, and/or database servers configured to run certain software applications and/or provide various security, web, storage, and/or database services. Although illustrated as a single entity in FIG. 4, backend computing system 402 may include and/or represent a plurality of servers and/or computing devices that work and/or operate in conjunction with one another.

As illustrated in FIG. 4, backend computing system 402 may include a database 410. In one example, database 410 may be configured to store information related to malicious and/or potentially malicious processes, files, and/or sources of such processes and files. Database 410 may also be configured to store information related to restore activities and analysis data correlating processes, files, and source data to restore activities. Database 410 may represent portions of a single database or computing device or a plurality of databases or computing devices. For example, database 410 may represent a portion of backend computing system 402 in FIG. 4, computing system 510 in FIG. 5, and/or portions of exemplary network architecture 600 in FIG. 6. Alternatively, database 410 may represent one or more physically separate devices capable of being accessed by a computing device, such as client device 202, computing device 206, and/or backend computing system 402 in FIG. 4, computing system 510 in FIG. 5, and/or portions of exemplary network architecture 600 in FIG. 6.

In at least one embodiment, analysis module 112 may transmit data related to restore activity 226 on client device 202 to backend computing system 402, for further analysis, comparison, and correlation with restore activities on other computing devices, such as other client devices. For example, if determining module 106 determines that a total number of restored files 236 restored during restore activity 226 exceeds threshold number 212, determining module 106 may identify restore activity 226 as being a significant restore activity that may be related to a potentially malicious threat. As discussed in greater detail above, security module 108 may perform, as part of client device 202 and/or computing device 206, a security action 214 to protect client device 202 from a malicious threat associated with restore activity 226, which is identified as a significant restore activity. Additionally or alternatively, analysis module 112 may send data related to restore activity 226 to backend computing system 402.

Database 410 may include data related to a plurality of computing devices and restore activities, including significant restore activities, performed on those computing devices. For example, as illustrated in FIG. 4, database 410 may include restore activity data 412 that includes data related to restore activities carried out by backup applications on a plurality of computing devices. Additionally, database 410 may include file data 414, computer process data 416, and source data 418 related to files, computer processes, and sources (e.g., file sources) associated with restore activities represented in restore activity data 412. Additionally, database 410 may include correlation data 420 correlating one or more data points in restore activity data 412, file data 414, computer process data 416, and/or source data 418.

Analysis module 112 may send any suitable data associated with restore activity 226, which was performed on client device 202, to backend computing system 402, without limitation. For example, following a restore activity 226 during which a total number of restored files 236 exceeded threshold number 212, analysis module 112 may send information that is determined to be associated with restore activity 226 to backend computing system 402. In one example, analysis module 112 may send, to backend computing system 402, at least one of file data associated with stored files 230 and/or restored files 236, computer process data associated with computer processes 232, and source data associated with source identifiers 234 on client device 202. In some examples, analysis module 112 may send, to backend computing system 402, analysis results focusing on certain files, computer process, and/or source identifiers associated with restore activity 226.

Analyzing module 112, which may be located, for example, on client device 202, computing device 206, and/or backend computing system 402, may further analyze data stored in database 410 to better protect computing devices and systems from malicious attacks. In one embodiment, analyzing module 112 may correlate, as part of backend computing system 402 and/or computing device 206 in FIG. 4, one or more sets of data stored in database 410. For example, analyzing module 112 may correlate sets of data in restore activity data 412 with sets of data in file data 414, computer process data 416, and/or source data 418 to generate corresponding sets of correlation data in correlation data 420.

In some embodiments, analyzing module 112 may correlate a computer process, file, and/or file source that is associated with restore activity 226 on client device 202 with at least with at least one other computer process, file, and/or file source related to at least one other restore activity on at least one other client device based on data (e.g., restore activity data 412, file data 414, and/or computer process data 416) in database 410.

The correlated data may be used to identify one or more files, computer processes, and/or data sources that are associated with restore activities on multiple computing devices, including client device 202, and that are therefore malicious or potentially malicious. In one example, malicious or potentially malicious files, computer processes, and/or data sources identified based on the correlations in database 410 may be added to, for example, a reputation database. Additionally, a security service may prevent computing devices, such as client device 202 and computing device 206, from accessing such malicious or potentially malicious files, computer processes, and/or data sources.

As described in connection with method 300 above, the systems and methods described herein may enable early detection and prevention of malware attacks by detecting and analyzing file restore activities on client computing devices. The systems and methods described herein may do so by identifying potentially malicious files, computer processes, and/or file sources that are associated with file restore activities. Additionally, the systems and methods described herein may correlate and analyze data from malware attacks related to suspicious file restore activities on multiple client computing devices.

The systems and methods described herein may improve the functioning of a computing device by enabling early detection of malware, thereby improving the security of the computing device and reducing time and resources expended to repair the computing device in the event that it is compromised by malware. These systems and methods may also improve the field of computer security by correlating and analyzing data from file restore activities occurring on multiple computing devices and utilizing the data to identify and prevent malware attacks on these and other computing devices.

In some embodiments, the disclosed systems and methods may enable detection of zero day malware attacks based on restore activities, both from local telemetry on individual user devices and from backend analytics related to such restore activities. Restore activities may be utilized on an infrequent basis by client device users. When files are restored to a computing device during a restore activity, the file restore activity may signal that a potentially significant event has occurred to the user's computing device. Restore activities may be broken into two categories, including accidental restore activities (i.e., non-significant restore activities) and significant restore activities. A non-significant restore activity may involve restoring only a few files. Alternatively, a non-significant restore activity may involve restoring a large number of files to a different system, computing device, file directory, and/or partition within a computing device. An accidental or non-significant restore activity may result from accidental deletions of a limited number of files or may be related to a user transferring data to new computing device or storage location. In contrast, a significant restore may involve restoring a large number of files within a particular directory or within user's entire backup set to the same computing device or system. Therefore, a defined threshold number of files or percentage of files may be used as trigger to identify significant restores warranting further investigation for root causes, such as a hardware failure or malware attack.

If backup telemetry identifies a client device restoring data to the same hard disk, then the restore activity may not be the result of a hardware failure. In such a circumstance, a backup client may trigger a trace of the client device by examining telemetry data collected locally about the end point. For example, the systems and methods disclosed herein may determine whether restored files have been modified on the user's device. The disclosed systems and methods may further identify processes that have modified the files and may determine if the files have all been modified by the same process or group of processes. The disclosed systems and methods may additionally determine if such processes are trustworthy and/or if they originated from an unknown source. The disclosed systems and methods may stop these processes if they are from an unknown or untrustworthy origin or source. Further, the disclosed systems and methods may research how related files landed on user's device (e.g., which URL the user clicked on, which email attachment the user opened, whether the files were transferred by USB drive, etc.). In some embodiments, such restore activities, and corresponding telemetry data, may be transmitted to a backend system to be added to a reputation database to prevent future attacks.

In at least one embodiment, the disclosed systems and methods may send restore related information to a backend computing system for further analysis and correlation. Data sent to a backend computing system may include, for example, files recently downloaded to a user's device, a calculation of the number of files restored during a restore activity, and/or the types of files restored during the restore activity. Additionally, data sent to a backend computing system may indicate whether files related to one drive were installed or whether files related to all drives were installed, and/or whether files were all restored to the same disk drive or to a separate disk drive. If a correlation between file downloads and/or process execution events from multiple systems is correlated to an elevated number of complete backup restores on multiple computing devices, the disclosed systems and methods may conclude that the files downloaded or processes executed in relation to restore activities may represent a zero day attack.

Figure 5:
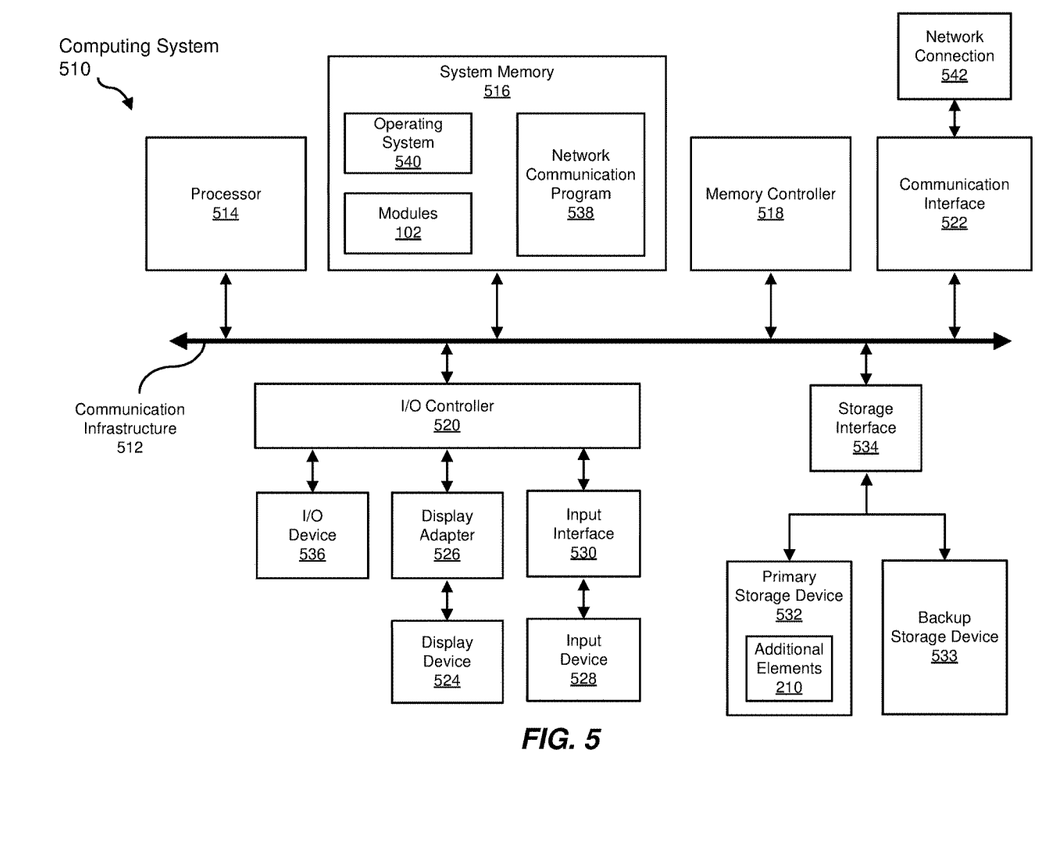
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, additional elements 210 from FIG. 2 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
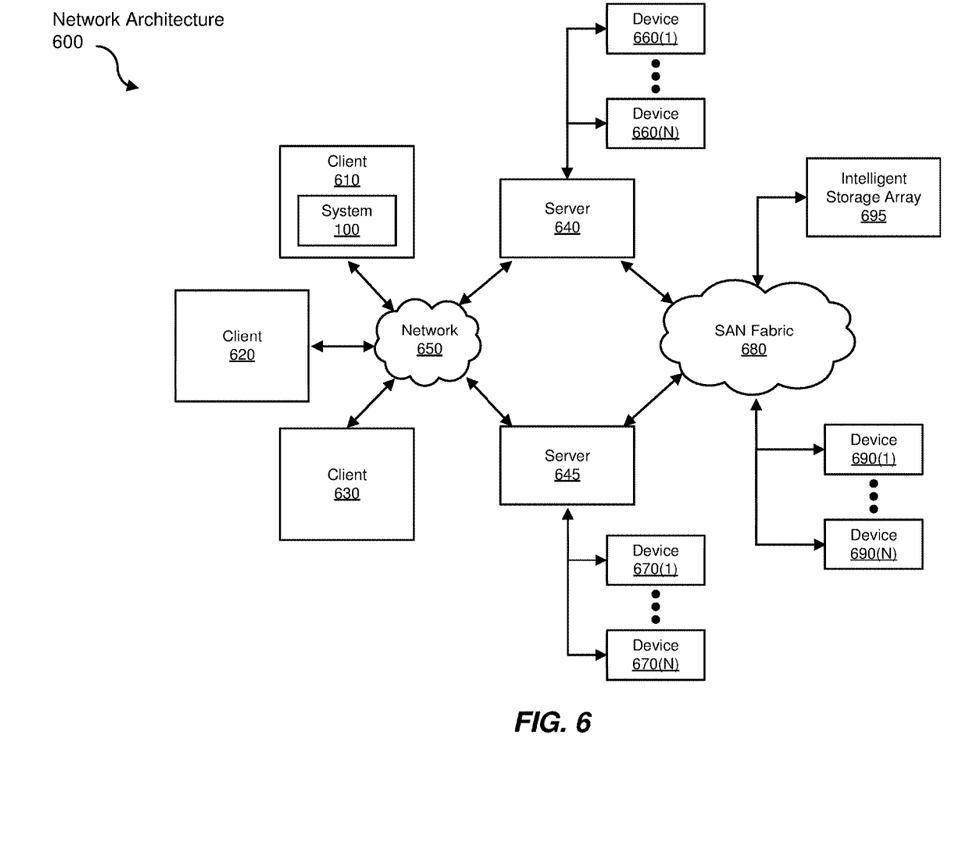
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for detecting and addressing suspicious file restore activities.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data, which is associated with a file restore activity, to be transformed, transform the data by correlating the data to other data associated with the file restore activity and/or other file restore activities, output a result of the transformation to a computing device and/or a backend computing system, use the result of the transformation to perform a security action to protect one or more computing devices from a malicious threat associated with the file restore activity, and store the result of the transformation to a computing device, server, and/or backend computing system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting and addressing suspicious file restore activities, at least a portion of the method being performed by a computing device comprising at least one processor, the method comprising:
    detecting a restore activity during which files are restored to a client device from a previously stored backup of the files;
    determining:
        that a total number of the files restored during the restore activity exceeds a threshold number;
        that the files restored during the restore activity originated from the client device; and
        based on the total number of the files restored during the restore activity exceeding the threshold number and that the files restored during the restore activity originated from the client device, that the restore activity is associated with a malicious threat; and
    performing, based on the total number of the files exceeding the threshold number, a security action to protect the client device from the malicious threat associated with the restore activity.

2. The computer-implemented method of claim 1, further comprising identifying a computer process that modified, prior to the restore activity, at least one of the files that were restored during the restore activity.

3. The computer-implemented method of claim 2, wherein performing the security action comprises blocking the computer process.

4. The computer-implemented method of claim 2, further comprising identifying a source of the computer process.

5. The computer-implemented method of claim 2, further comprising correlating the computer process with at least one other computer process related to at least one other restore activity on at least one other client device.

6. The computer-implemented method of claim 1, further comprising identifying at least one of the files that were restored during the restore activity.

7. The computer-implemented method of claim 6, further comprising determining whether the at least one of the files was modified prior to being restored.

8. The computer-implemented method of claim 1, further comprising identifying at least one source of the files that were restored during the restore activity.

9. The computer-implemented method of claim 8, wherein performing the security action comprises preventing the client device from accessing the at least one source of the files.

10. The computer-implemented method of claim 1, further comprising correlating the files restored to the client device with other files restored to at least one other client device during at least one other restore activity.

11. The computer-implemented method of claim 1, further comprising identifying at least one of a suspicious process, a suspicious file, and a suspicious file source related to the restore activity.

12. The computer-implemented method of claim 1, wherein the threshold number corresponds to a specified percentage of all files stored on the client device.

13. The computer-implemented method of claim 1, further comprising:
    detecting an additional restore activity to restore a group of files to the client device from the previously stored backup of the files;
    determining that a total number of files in the group of files is at or below the threshold number; and not performing, based on the total number of the files in the group of files being at or below the threshold number, an additional security action.

14. The computer-implemented method of claim 1, wherein performing the security action comprises preventing the client device from accessing at least one of a file, a computer process, and a file source.

15. The computer-implemented method of claim 1, wherein performing the security action comprises adding at least one of a file, a computer process, and a file source to a blacklist.

16. The computer-implemented method of claim 1, further comprising determining whether the files were restored to the client device from another computing device during the restore activity.

17. A system for detecting and addressing suspicious file restore activities, the system comprising:
a detecting module, stored in memory, that detects a restore activity during which files are restored to a client device from a previously stored backup of the files;
a determining module, stored in memory, that determines:
that a total number of the files restored during the restore activity exceeds a threshold number;
that the files restored during the restore activity originated from the client device; and
based on the total number of the files restored during the restore activity exceeding the threshold number and that the files restored during the restore activity originated from the client device, that the restore activity is associated with a malicious threat;
a security module, stored in memory, that performs, based on the total number of the files exceeding the threshold number, a security action to protect the client device from the malicious threat associated with the restore activity; and
at least one processor that executes the detecting module, the determining module, and the security module.

18. The system of claim 17, further comprising an identifying module, stored in memory, that identifies a computer process that modified, prior to the restore activity, at least one of the files that were restored during the restore activity.

19. The system of claim 17, further comprising an identifying module, stored in memory, that identifies at least one of the files that were restored during the restore activity.

20. A non-transitory computer-readable medium comprising one or more computer-executable instructions that, when executed by at least one processor of a computing device, cause the computing device to:
detect a restore activity during which files are restored to a client device from a previously stored backup of the files;
determine:
that a total number of the files restored during the restore activity exceeds a threshold number;
that the files restored during the restore activity originated from the client device; and
based on the total number of the files restored during the restore activity exceeding the threshold number and that the files restored during the restore activity originated from the client device, that the restore activity is associated with a malicious threat; and
perform, based on the total number of the files exceeding the threshold number, a security action to protect the client device from the malicious threat associated with the restore activity.

* * * * *